United States Patent [11] 3,578,375

| | | | | | |
|---|---|---|---|---|---|
| [72] | Inventor | Donald W. Finefrock<br>Massillon, Ohio | 1,857,796 | 5/1932 | Styslinger............... 296/28(.22) |
| [21] | Appl. No. | 801,561 | 2,209,403 | 7/1940 | Kittner et al............. 287/189.36 |
| [22] | Filed | Feb. 24, 1969 | 2,392,789 | 1/1946 | Watter................... 105/422X |
| [45] | Patented | May 11, 1971 | | FOREIGN PATENTS | |
| [73] | Assignee | The Johnson Rubber Company<br>Middlefield, Ohio | 423,304 | 1/1935 | Great Britain............. 280/169 |
| | | | 887,117 | 1/1962 | Great Britain............. 296/28 |
| | | | 659,171 | 1/1964 | Italy...................... 296/29 |

Primary Examiner—Leo Friaglia
Assistant Examiner—John A. Pekar
Attorney—McNenny, Farrington, Pearne and Gordon

[54] CUSHIONING LINER FOR VEHICLES OR THE LIKE
14 Claims, 5 Drawing Figs.

[52] U.S. Cl.................................................... 296/39,
52/177, 105/422, 296/1
[51] Int. Cl.................................................... B62d 33/00
[50] Field of Search.......................................... 296/39, 28,
1 (F), 41; 52/177, 479, 622; 287/189, 36 (D);
105/422, 423; 280/169

[56] References Cited
UNITED STATES PATENTS
1,640,796  8/1927  Miller........................... 105/422X ABSTRACT: A cushioning liner is disclosed which combines a plurality of elongated elastomeric sheet members and a plurality of elongated elastomeric rib members mounted between adjacent edges of sheet members. The ribs are provided with T-shaped longitudinal slots along which metal plates extend to distribute clamping loads. Bolt fasteners are mounted in the plate at spaced intervals therealong to bolt the ribs to the supporting surface and in turn clamp the sheets in position. The ribs and sheets are provided with mating interlocking surface arranged so that they provide mutual lateral support.

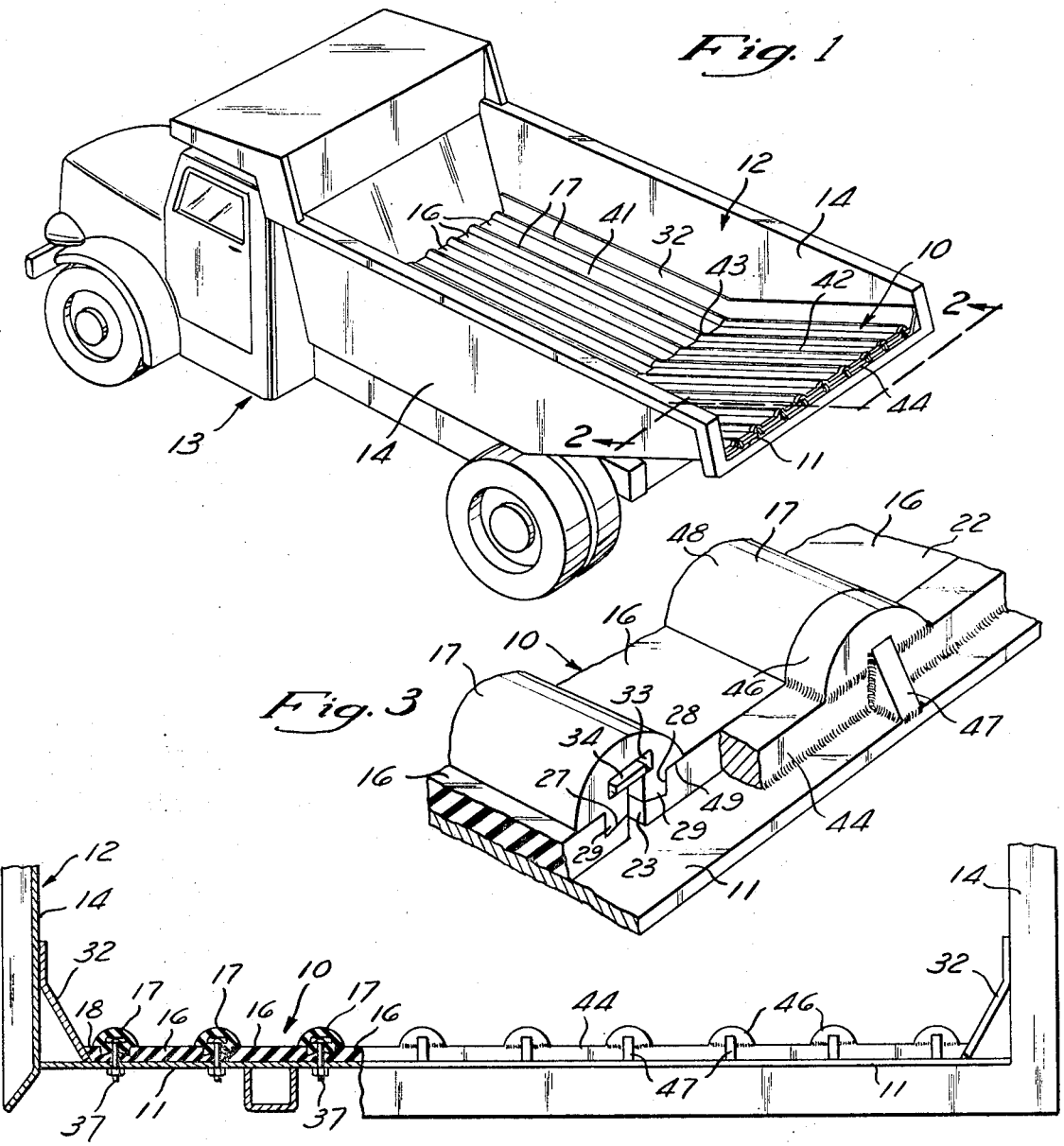
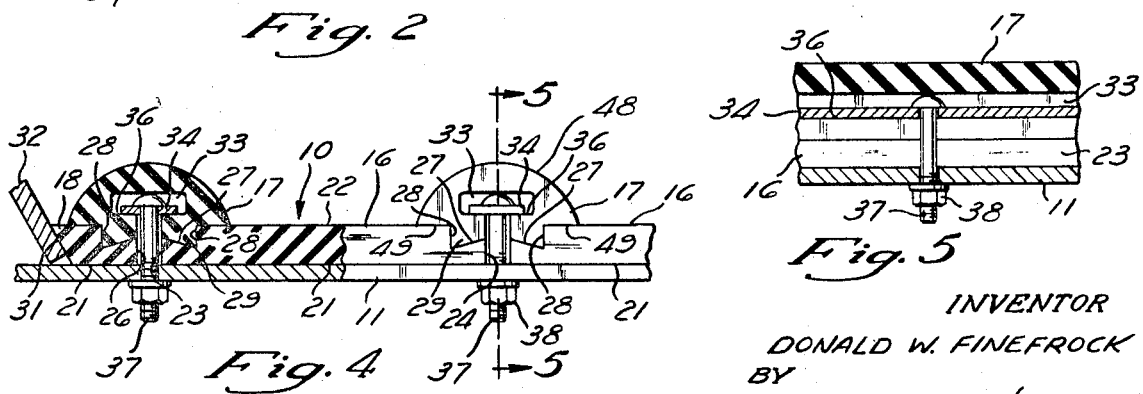

CUSHIONING LINER FOR VEHICLES OR THE LIKE

BACKGROUND OF THE INVENTION

This invention relates generally to protective coverings for surfaces subjected to impact loading and more particularly to a novel and improved cushioning structure suitable to protect relatively large surfaces from damage caused by heavy impact loading. For example, a preferred embodiment of this invention is particularly suited for protecting the load-carrying body of large trucks or the like from damage when the loads are dropped onto the load body.

PRIOR ART

In many cases it is desirable to provide a protective cushioning structure to prevent damage to surfaces subjected to impact loading. For example it is common practice to load large earthmoving vehicles of the type used for road construction or the like by using loading machines which drop the load a substantial distance into the load body. Particularly large impact loads are encountered when the load includes large heavy pieces of rock or ore. In such instances damage can and often does occur even when the load body of the vehicle is formed of heavy metal structural elements.

Various types of structures have been proposed to minimize the damage caused to a surface such as the load-carrying surface of a vehicle. In some instances wooden planks or sheets are secured into position to provide the impact and wear surface. Examples of such structures are illustrated in the U.S. Letters Pat. Nos. 1,588,000; 1,807,715; 2,256,037; and 2,919,663. Such structures generally provide little or no effective cushioning and are unsatisfactory where heavy impact loading is encountered.

In other instances sheathing or lining formed of elastomeric material such as rubber or the like has been proposed. An example of such an arrangement is illustrated in the U.S. Letters Pat. No. 2,209,403. This structure illustrated in the patent, however, involves expensive molding processes for manufacture and does not provide a suitable structure for protecting a wall against heavy impact loading.

SUMMARY OF THE INVENTION

In accordance with the present invention, a structure is provided which can be easily formed by low-cost extrusion methods. The structure is arranged so that elements of relatively small section can be combined to cover a surface of substantially any size and can be used in some instances on a surface having an irregular shape.

In the illustrated embodiment of this invention a cushioning liner structure is shown installed on the floor of the load body of a large dump-type vehicle. It should be understood, however, that in accordance with the broader aspects of this invention, it may be used, not only in other types of vehicles, but also in nonvehicular installations.

In the illustrated embodiment a liner combines a plurality of separate elongated sheets of elastomeric material such as rubber and a plurality of elongated rib members. The rib members are secured to the load body by fastening means including a lengthwise metallic plate and bolt-type fasteners located along the length of the plate at suitable intervals. The fasteners secure the plate in position and the plate in turn distributes the mounting forces along the ribs to provide a relatively even distribution of the mounting forces. The rib is formed so that the bolt fasteners and the mounting plate are located in an internal opening or slot within the rib so that the rib cushions the fastening means against damage and provides in combination with the sheet members an uninterrupted cushioning surface.

The elongated sheets and the ribs are formed with interlocking mating surfaces which secure the sheets in place and cooperate to resist lateral movement of the ribs and sheets.

DESCRIPTION OF THE DRAWINGS

FIG. 1 is a perspective view of a typical dump-type vehicle with a cushioning liner incorporating this invention installed on the floor surface of the load body;

FIG. 2 is an enlarged fragmentary cross section taken generally along 2–2 of FIG. 1;

FIG. 3 is an enlarged fragmentary perspective view of the end of the cushioning liner;

FIG. 4 is an enlarged fragmentary section illustrating the structure of the cushioning liner; and, FIG. 5 is a fragmentary section taken generally along 5–5 of FIG. 4.

Referring to FIG. 1, a cushioning liner assembly 10 is illustrated installed along the floor or bottom wall 11 of the load body 12 of a typical dump-type truck 13. In such a vehicle it is common practice to drop the load into the load body 12 utilizing a front loader or the like. Therefore, the principal impact load on the load body occurs along the bottom wall 11. Consequently the sidewalls 14 of such a vehicle would normally not be provided with a cushioning liner assembly 10. It should be understood that the vehicle 13 is illustrated as an example of one type of installation for a cushioning liner incorporating this invention but that such a cushioning liner finds utility in other types of installations whether vehicular or nonvehicular.

Referring now to FIGS. 2 through 5, the cushioning liner assembly 10 includes a plurality of similar elongated sheet members 16 which are preferably formed of elastomeric material by extruding procedures. The use of extrusion to form the members 16 is preferred since the members can be manufactured to any desired length at relatively low cost. The members 16 are positioned lengthwise of the bottom wall 11 as best illustrated in FIG. 1. A plurality of similar cushioning ribs 17 are mounted adjacent to the longitudinal edge of each of the sheet members 16. Here again the ribs 17 are formed of an elastomeric material, preferably by extrusion. Positioned along the two adjacent sides of the bottom wall 11 of the load body 12 are similar but oppositely mounted elongated side members 18. Here again such members are preferably formed by extrusion of an elastomeric material.

The material used to form the sheet members 16, rib members 17, and side members 18 is normally the same material. Such material should provide substantial toughness, cushioning resilience, a high tensile strength, and abrasion resistance. One material which provides such properties is a stryene-butadiene rubber having a tensile strength in the order of 3,000 p.s.i. and a hardness of about 70 D on the Shore A scale.

The sheet members 16 and side members 18 are formed with a flat back side 21, adapted to fit along the upper surface of the lower wall 11, and a flat front side 22 which is substantially parallel to the back side 21. Both longitudinal edges 23 and 24 of the sheet members 16 and one longitudinal edge 26 of each side member 18 are formed with surfaces which mate with corresponding faces on the associated ribs 17 to provide an interlocking joint therebetween. These faces include inclined faces 27 extending inwardly from the adjacent longitudinal edge and inclined toward the back side 21. The inclined faces 27 terminate at a face 28 extending therefrom to the front side 16 substantially perpendicular relative thereto. These faces 27 and 28 cooperate to form a locking groove adjacent to the edges of the sheet and side members 16 and 18.

The ribs 17 are each formed with wedge-shaped projections 29, each of which provides mating surfaces adapted to fit against and tightly engage the associated faces 27 and 28. The interengagement of these faces provides interlocking joint means which laterally position the elongated members 16 and 18 and secure the longitudinal edges tightly against the wall 11. In the illustrated embodiment the side members are formed with inclined sides 31 which tightly fit against the surface of fillet elements 32. The fillet elements 32 constitute part of the main load body 12.

In order to fasten the rib member 17 to the wall 11 a structure, best illustrated in FIGS. 4 and 5, is utilized. Each of the ribs 17 is formed with a lengthwise extending centrally located T-shaped slot or opening 33. A metal plate or strap 34 extends along the upper or cross portion of the slot 33 and engages the bottom wall thereof on each side of the center opening of the slot. A plurality of bolt fasteners 37, preferably of the carriable type, are spaced at intervals along the plate 34 and extend down through the central portion of the slot 33 through holes in the wall 11. Nuts 38 are threaded onto the bolts and are drawn up to cause the plates 34 to tightly clamp the ribs and in turn the members 16 and 18 in place.

The metal plates 34 serve to distribute the mounting force along the surfaces 36 to prevent tearing of the rib material resulting from excessive localized loading and to insure that a tight contact is provided along the entire length of the liner members. The use of carriage bolts which are provided with noncircular section immediately below their heads is preferred since these sections are sized to tightly fit into the openings through the plate 34 to prevent rotation of the bolts with respect to the plates when the nuts 38 are tightened. The bolts 37 are spaced along the plate 34 at sufficiently close intervals to insure that the clamping or mounting forces are evenly distributed along the entire rib structure. They need not be located at exactly even intervals, however, and may be located at uneven intervals if truck body structure interferes with access for mounting.

In the illustrated installation on the vehicle 13 the floor 11 of the load body 12 is provided with a horizontal planar section 41 and an inclined planar section 42 at the rearward end. The two planar sections intersect at 43 with an obtuse angle. In such an installation the elastomeric members preferably extend the full length and are not interrupted at the intersection 43 between the two sections 41 and 42. Since these members are formed of elastomeric material, they can easily bend to accommodate the angle at this location. In such an installation, however, it is desirable to use two separate plates 34 which abut at the bend 43 rather than a single plate which would have to be bent at the intersection.

The rearward end of the cushioning liner is preferably protected by a metal end assembly, best illustrated in FIG. 3, which has a profile similar to the liner. This assembly includes a bar 44 welded to the floor 11, a semicylindrical end member 46 located in alignment with each rib 17 and triangular-shaped brace members 47. The members 46 are welded to the bar 44 and the brace members 47 are welded to the bar 44, the members 46, and the floor 11. For this structure end protection of the liner is provided.

The ribs 17 in the illustrated embodiment are provided with an outer surface 48 which is semicylindrical. With such a structure a relatively uniform high degree of cushioning is provided and sharp edges which could tear are not present. Preferably the ribs are formed to extend over the front sides 22 at 49 along the adjacent longitudinal edges of each of the members 16 and 18.

The interlocking structure provided by the surfaces 27 and 28 and the wedge-shaped projections 29 insure that the ribs 17 do not spread when they are clamped in place or when they are subjected to impact loading. The ribs 17 coact with the adjacent longitudinal members 16 and 18 to laterally support each other. With this structure extremely high impact loads can be encountered with destructive or damaging results.

Because the ribs 17 project above the surface of the longitudinal members 16 and 18, they encounter more impact loading than the members 16 and 18. The longitudinal opening 33 serves a dual function. It provides a location for the fastening plates 34 and bolts 37 and in addition provides a void which improves the cushioning flexibility of the ribs. When an impact occurs, the rib can deform inwardly to a limited extent to cushion the impact. This improves the cushioning characteristics of the structure when compared with a solid structure.

The preferred cushioning liner incorporating this invention has the advantage of being easily installed since it is merely necessary to slide the plates 34 with the bolts 37 installed thereon along the slots 36 before positioning the various elements on the truck body for mounting. Similarly if one or more elements of the liner are damaged it is easily replaced without discarding the entire liner assembly.

In many instances in the past dump-type vehicles have been provided with means to heat the floor of the load body to prevent the load from freezing in the body during winter operation. Such heating is also often used even when freezing is not encountered, since certain types of loads tend to slide out of the body more easily when heated. Usually this heating is accomplished by ducting exhaust gases along the floor of the load body in ducts which constitute part of the structure of the load body. With a cushioning liner in accordance with this invention, such heating may be eliminated in many instances since most loads do not tend to adhere tightly to rubber during freezing. Also the flexibility of the cushioning liner tends to break any bonds which might occur.

The use of an assembly consisting of a plurality of similar members is also an advantage since the number of members can be increased or decreased to provide the necessary total area of coverage. Further elastomeric materials such as rubber are substantially immune to weathering and the liner protects the basic structure from damage from the elements.

Although a preferred embodiment of this invention is illustrated, it is to be understood that various modifications and rearrangements may be resorted to without departing from the scope of the invention disclosed.

I claim:

1. A liner structure comprising a surface subject to impact or the like, an elongated sheet member formed of elastomeric material having a back side fitting along said surface and a front side, rib members formed of elastomeric material fitting along each longitudinal edge of said sheet member and providing a portion overlapping the surface of said front side adjacent to the associated edge, a plurality of fastening means spaced from the surface of said rib and spaced therealong, said fastening means securing said rib to said surface and applying forces pressing said portion against said front side, said fastening means including force distributing means operating to distribute said forces over a substantial area within said rib, said rib covering said fastening means with a thickness sufficient to provide substantial cushioning of said fastening means and preventing damage thereto, said sheet member and said rib members providing mating faces forming an interlocking groove and projection connection extending substantially parallel to the adjacent edge of said sheet member and providing mutual lateral support between said members.

2. A liner structure as set forth in claim 1 wherein said mating faces formed on said sheet member include a first face extending substantially normal to said front side spaced from the adjacent longitudinal edge and a second face inclined therefrom back toward said front face.

3. A liner structure as set forth in claim 2 wherein said ribs are provided with a substantially semicylindrical exterior surface.

4. A liner structure as set forth in claim 3 wherein said ribs are formed with a longitudinal substantially T-shaped slot, and said force distributing means includes an elongated rigid plate extending lengthwise of the upper portion of said slot.

5. A liner structure as set forth in claim 4 wherein said fastening means includes a bolt anchored in said plate and held against rotation relative thereto.

6. A liner structure as set forth in claim 5 wherein a plurality of bolts are spaced along said plate.

7. A liner structure as set forth in claim 1 wherein said ribs are formed with a longitudinal substantially T-shaped slot, and said force distributing means includes an elongated rigid plate extending lengthwise of the upper portion of said slot.

8. A liner structure as set forth in claim 7 wherein said fastening means includes a bolt anchored in said plate and held against rotation relative thereto.

9. A liner structure as set forth in claim 8 wherein a plurality of bolts are spaced along said plate.

10. A liner structure as set forth in claim 1 wherein said elastomeric material has a tensile strength in the order of 3,000 pounds per square inch and a hardness in the order of 70 D on the Shore A scale.

11. A liner structure as set forth in claim 1 wherein a plurality of adjacent sheet members are secured to said surface, and at least some of said rib members are associated in a similar manner with an adjacent sheet member on each side thereof.

12. A combination as set forth in claim 11 wherein said surface includes two planar portions joined along an intersection forming an obtuse angle, at least some of said rib and sheet members extending across said intersection, and separate plates provided on each side of said intersection.

13. A combination as set forth in claim 12 wherein said surface is part of a load body of a vehicle.

14. A combination as set forth in claim 13 wherein a rigid end support formed with a profile similar to the profile of the liner is mounted on said surface adjacent to at least one end of said liner.